US008650257B2

(12) United States Patent
Luo

(10) Patent No.: US 8,650,257 B2
(45) Date of Patent: Feb. 11, 2014

(54) METHOD, SYSTEM AND MOBILE TERMINAL FOR PROCESSING SHORT MESSAGE

(75) Inventor: Wenping Luo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 134 days.

(21) Appl. No.: 13/383,853

(22) PCT Filed: May 24, 2010

(86) PCT No.: PCT/CN2010/073153
§ 371 (c)(1),
(2), (4) Date: Jan. 13, 2012

(87) PCT Pub. No.: WO2011/009334
PCT Pub. Date: Jan. 27, 2011

(65) Prior Publication Data
US 2012/0117176 A1    May 10, 2012

(30) Foreign Application Priority Data

Jul. 20, 2009   (CN) .......................... 2009 1 0161332

(51) Int. Cl.
*G06F 15/16* (2006.01)
(52) U.S. Cl.
USPC ........................... 709/206; 709/203; 455/418
(58) Field of Classification Search
USPC ........................... 709/203, 206; 455/418, 466
See application file for complete search history.

(56) References Cited

U.S. PATENT DOCUMENTS

2008/0182566 A1* 7/2008 Camp, Jr. ...................... 455/418

FOREIGN PATENT DOCUMENTS

| CN | 1638514 A | 7/2005 |
|---|---|---|
| CN | 1753514 A | 3/2006 |
| CN | 1901704 A | 1/2007 |
| CN | 1929660 A | 3/2007 |
| CN | 101616377 A | 12/2009 |
| CN | 101621754 A | 1/2010 |
| EP | 1276301 A1 | 1/2003 |
| EP | 1753214 A1 | 2/2007 |

OTHER PUBLICATIONS

3GPP TS 23.040 V6.8.0 (Sep. 2006): 3rd Generation Partnership Project; Technical Specification Group Core Network and Terminals; Technical realization of the Short Message Service (SMS) (Release 6).
International Search Report for PCT/CN2010/073153 dated Aug. 3, 2010.

* cited by examiner

*Primary Examiner* — Frantz Jean
(74) *Attorney, Agent, or Firm* — Ling Wu; Stephen Yang; Ling and Yang Intellectual Property

(57) ABSTRACT

A method for processing a short message is provided in the present invention, which includes that a sending party editing short message text and sending a short message including the short message text and a template identifier (ID) to a short message service center; and a receiving party receiving the short message sent from the short message service center, analyzing to obtain the template ID included in the short message, then finding a template with a same template ID, and combining the template that is found with the short message text to be displayed. With the scheme of the present invention, directly sending the short message between the sending party and the receiving party can just achieve the effect of enhancing the interestingness of the short messages without increasing the processing burden of the short message service center and the occupation of the network resources.

14 Claims, 3 Drawing Sheets

METHOD, SYSTEM AND MOBILE TERMINAL FOR PROCESSING SHORT MESSAGE

TECHNICAL FIELD

The present invention relates to the field of communication, and more especially, to a method, a system and a mobile terminal for processing a short message.

BACKGROUND OF THE RELATED ART

The short message service, with features of simplicity, convenience, quickness and low cost, is a very mature message service, and is a most popular communication way for a majority of users, especially younger users. Meanwhile, the short message also brings massive profits to the operators.

The short messages known in the art mainly are text messages. The sending party inputs the short message content in the mobile phone and sends the short message, and the receiving party displays the same text content after receiving the short message. This way seems too monotonous for the current users, especially the modern young people. In order to provide a personalized service for users and effectively increase the operating income, the short message service-based value-added services, such as short message transferring, short message filtering and short message storing and so on, are emerging at present. In all these services, there are more researches related to converting a short message to a multimedia message.

The multimedia message, namely the multimedia message service, can send multimedia data including text, images, audio and video and so on, which is the main characteristics and use thereof. Compared with common short message, the multimedia message service greatly enhances the interestingness in the communication information exchange. Currently, the sending methods in which the short message is converted into a multimedia message are all that the sending party sends the short message to the short message service center, and then the short message service center executes the message analysis and content adaptation to generate a new multimedia message to send to the receiving party. This method has the following disadvantages:

1) the work of converting the short message to a multimedia message is completed in the short message service center, which increases the workload of the short message service center and the burden of user management, such as: the charge information generated due to the user using the service of converting the short message to a multimedia message;

2) generating a new multimedia message according to the content adaptation results might have adaptation "distortion" results, which will be self-defeating and result in a poor user experience;

3) transferring the generated multimedia message from the short message service center to the receiving party is based on the Wireless Application Protocol (WAP), thus the network traffic is increased and more network resources are occupied, and the traffic charge of the receiving party would be increased;

4) for the receiving party, frequently receiving the multimedia messages requires relatively large storage space.

SUMMARY OF THE INVENTION

In view of this, the main object of the present invention is to provide a method, a system and a mobile terminal for processing a short message to enhance the interestingness of short messages without increasing the processing burden of the short message service center and the occupation of network resources.

To achieve the above object, the technical scheme of the present invention is implemented as follows.

A method for processing a short message provided in the present invention comprises:

a sending party editing short message text and sending a short message including the short message text and a template identifier (ID) to a short message service center; and a receiving party receiving the short message sent from the short message service center, analyzing to obtain the template ID included in the short message, then finding a template with a same template ID, and combining the template that is found with the short message text to be displayed.

In the above scheme, the sending party editing the short message text and sending the short message including the short message text and the template ID to the short message service center comprises: the sending party editing the short message text, selecting a template from a local template library, extracting the template ID of the template that is selected, and adding a special flag for indicating that the template ID is included, and the sending party taking the short message text, the template ID and the special flag as a short message body to send to the short message service center.

In the above scheme, said analyzing to obtain the template ID included in the short message comprises: the receiving party analyzing the short message body after receiving the short message, judging whether the template ID is included in the short message or not by searching the special flag, and analyzing to obtain the template ID.

In the above scheme, finding the template with the same template ID comprises: finding the template with the same template ID from a local template library;

the method further comprises: if the template with the same template ID is not found in the local template library, prompting whether to download a corresponding template or not.

In the above scheme, after selecting the template from the local template library, the method further comprises: previewing the template that is selected;

previewing the template that is selected comprises: choosing to preview the template, and the template automatically filling the short message text into a corresponding field in a template packet to be previewed.

A system for processing a short message provided in the present invention comprises:

a sending party, which is configured to: edit short message text, and send a short message including the short message text and a template ID to a short message service center;

the short message service center, which is configured to: receive the short message from the sending party, and send the short message to a receiving party; and the receiving party, which is configured to: analyze a short message body, find a template with a same template ID by analyzing to obtain the template ID included in the short message, and combine the short message text and the template that is found to be displayed.

In the above scheme, the sending party comprises: a local template library, a short message editing module, and a short message sending module; wherein, the local template library is configured to: store local templates of the sending party;

the short message editing module is configured to: edit the short message text, and select a template from the local template library, extract the template ID, and add a special flag for indicating that the template ID is included, take the template ID, the special flag and the short message text to be sent as the short message body to send to the short message sending module all together;

the short message sending module is configured to: send the short message to the short message service center.

In the above scheme, the receiving party comprises: a short message receiving module, a short message displaying module, and a local template library; wherein, the short message receiving module is configured to: receive the short message sent from the short message service center and forward the short message to the short message displaying module;

the short message displaying module is configured to: analyze the short message body, judge whether the template ID is included in the short message body or not by searching the special flag, analyze to obtain the template ID, find the template with the same template ID in the local template library, and combine the short message text and the template that is found to be displayed in a form of a multimedia message;

the local template library is configured to: store local templates of the receiving party.

In the above scheme, the sending party further comprises:

a short message previewing module, which is configured to combine the template that is selected and the short message text to be previewed when the short message editing module selects the template from the local template library.

In the above scheme, the receiving party further comprises: a template downloading module, which is configured to: send a short message with the template ID of a template to be downloaded to the short message service center and download the template and save the template into the local template library based on a notification message including a download address sent from the short message service center;

the short message service center is also configured to: receive the short message including the template ID of the template to be downloaded sent by the receiving party, and find the download address of the template in a content server in a network according to the template ID in the short message, and send the download address to the receiving party;

the content server is configured to: store templates uploaded by content providers or users and provide download addresses of templates for the short message service center.

A mobile terminal provided in the present invention comprises: a local template library, a short message editing module, and a short message sending module; wherein, the local template library is configured to: store local templates of a sending party;

the short message editing module is configured to: edit short message text, and select a template from the local template library, extract a template ID, and add a special flag for indicating that the template ID is included, take the template ID, the special flag and the short message text to be sent as a short message body to send to the short message sending module all together;

the short message sending module is configured to: send a short message to a short message service center.

In the above scheme, the mobile terminal further comprises:

a short message previewing module, which is configured to: combine the template that is selected and the short message text to be previewed when the short message editing module selects the template from the local template library.

A mobile terminal provided in the present invention comprises: a short message receiving module, a short message displaying module, and a local template library; wherein, the short message receiving module is configured to: receive a short message sent from a short message service center and forward the short message to the short message displaying module;

the short message displaying module is configured to: analyze a short message body, judge whether a template ID is included in the short message body or not by searching a special flag, analyze to obtain the template ID, find a template with a same template ID in the local template library, and combine short message text and the template that is found to be displayed in a form of a multimedia message;

the local template library is configured to: store local templates of a receiving party.

In the above scheme, the mobile terminal further comprises:

a template downloading module, which is configured to: send a short message with the template ID of a template to be downloaded to the short message service center and download the template and save the template into the local template library based on a notification message including a download address sent from the short message service center.

With the method, system and mobile terminal for processing the short message proposed in the present invention, the sending party sends the common short messages which is just required to include the template ID, and the receiving party combines the text and the template according to the template ID and then takes the template as the background to display personalized text in the self defined position in the template, so that directly sending the short message between the sending party and the receiving party can just achieve the effect of enhancing the interestingness of the short messages without increasing the processing burden of the short message service center and the occupation of the network resources, and thus the network traffic is reduced, the storage space in the users' mobile phones is saved, and value-added service contents are created for the operators.

PREFERRED EMBODIMENTS OF THE PRESENT INVENTION

In the following, the present invention will be described in detail with combination of the accompanying drawings and the specific embodiments.

Figure 1:
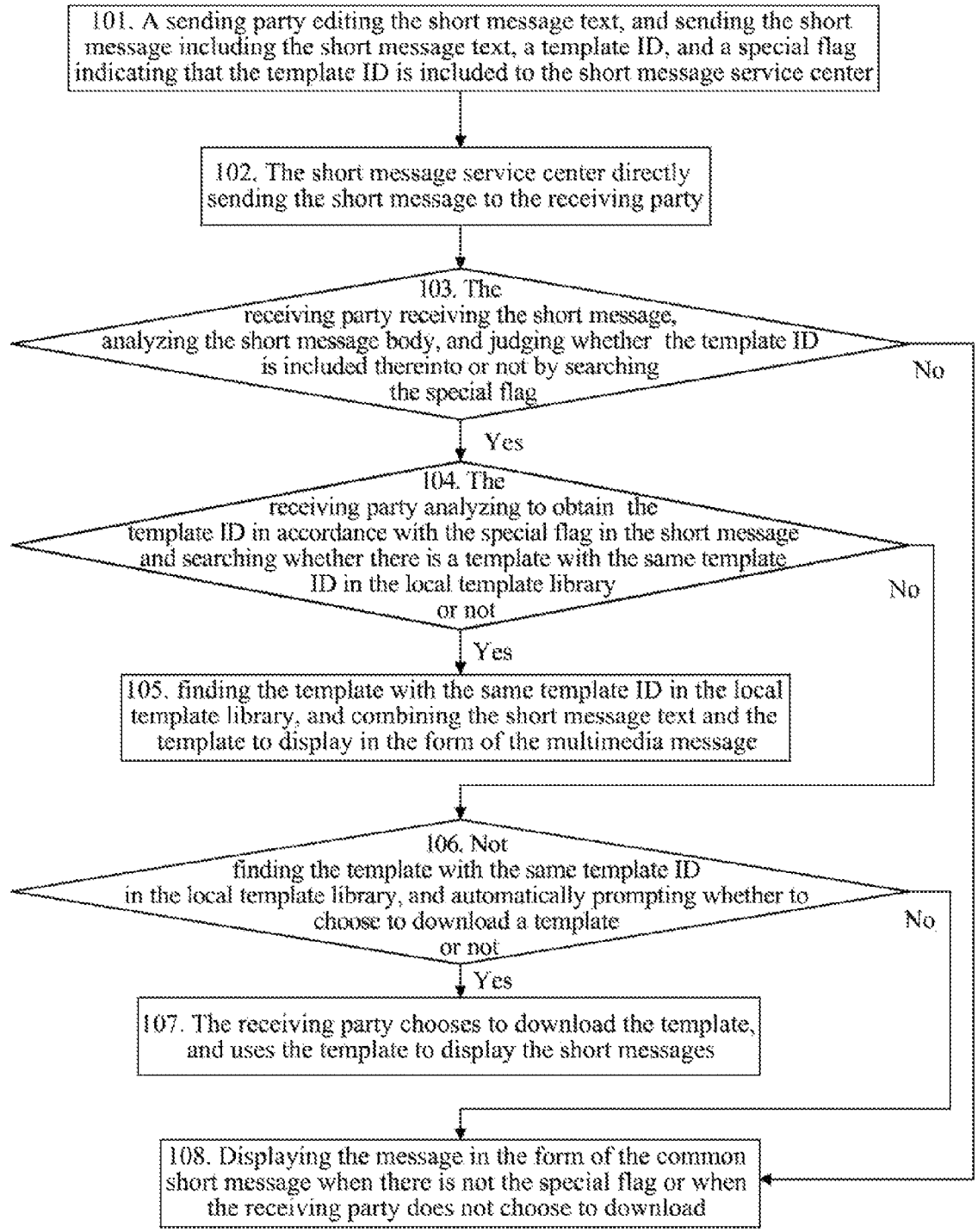
FIG. 1 is the flow chart of a method for processing a short message implemented according to the present invention.

The present invention implements a method for processing short message, and as shown in FIG. 1, the method comprises the following steps:

step 101: the sending party edits the short message text, and sends the short message including the short message text, the template ID, and the special flag indicating that the template ID is included to the short message service center;

specifically, the sending party edits the short message text, and selects a template from the local template library. When selecting the template, since each template has a unique ID, the template ID of the selected template is extracted, and a special flag for indicating that the template ID is included is added, meanwhile, the special flag separates the template ID from the short message text so that the receiving party can determine the position of the template ID according to the special flag to analyze to obtain the template ID. The sending party forms the short message body with the short message text, the template ID and the special flag and sends the short message body to the short message service center;

wherein the template might be a postcard template, which is a data packet, downloaded from the content server based on the Hypertext Transfer Protocol (HTTP) and saved in the sending party, can be previewed and defines the multimedia elements. The postcard template includes a plurality of multimedia elements mainly including audios, videos, pictures, and text, and so on, and uses the descriptive language to perform personalized configuration on the various attributes of the multimedia elements such as the display position, play time, and interface layout and so on. This descriptive language is similar to the Synchronized Multimedia Integration Language (SMIL) in the multimedia message. As long as a postcard template is selected, the postcard template will automatically performing rendering in accordance with the descriptive language, so as to immediately display an effect similar to the multimedia message. The postcard template can be created by the content providers and be uploaded to the content server, or can also be locally edited by the users and be uploaded to the content server, which is a new function and service.

Furthermore, in this step, when selecting the template, it might further choose to preview the template. Since templates have defined information such as the display position, font and size and so on of the short message text that is combined into the short message text, the template automatically fills the short message text into the appropriate fields of the template data packet, and renders other multimedia data such as pictures and audios and so on in accordance with the template's own descriptive language so as to have a preview; then confirmation is prompted, and the preview is exited after the confirmation and the confirmation information is returned; then it is continued to extract the template ID, add the special flag, and form the short message body with the short message text, the template ID and the special flag to send to the short message service center;

step 102: the short message service center directly sends the short message to the receiving party;

step 103: the receiving party receives the short message, analyzes the short message body, judges whether the template ID is included or not by searching the special flag, and if the special flag is included, proceeds to step 104; if the special flag is not included, proceeds to step 108;

step 104: the receiving party analyzes to obtain the template ID in accordance with the special flag in the short message and searches whether there is a template with the same template ID in the local template library or not, and if yes, proceeds to step 105, if not, proceeds to step 106;

step 105: the template with the same template ID is found in the local template library, the short message text and the template are combined to be displayed in the form of the multimedia message, and the current procedure ends;

specifically, the template with the same template ID is found in the local template library, and since the template has defined information such as the display position, font, and size and so on of the short message text that is combined, the template automatically fills the analyzed text character string into the appropriate fields in the template data packet, and renders other multimedia data such as pictures and audios and so on in accordance with the template's own descriptive language, then the short message can be displayed in the form of the multimedia message;

step 106: the template with the same template ID is not found in the local template library, whether to choose to download the template or not is automatically prompted, and if yes, step 107 is performed, otherwise step 108 is performed;

step 107: the receiving party chooses to download the template, and uses the template to display the short messages, and the current procedure ends;

specifically, if the receiving party chooses to download the template, the receiving party sends a special short message to the short message service center to notify the short message service center of the template ID of the template to be downloaded; the short message service center finds the download address of the template in the content server in the network according to the template ID in the short message after receiving the special message and sends the download address to the receiving party; wherein the template is generally created by the content provider and is uploaded to the content server;

the receiving party downloads the template according to the download address and saves the template to a local template library after receiving a notification message with the download address sent from the short message service center. The receiving party reads the message with the template, and then can display the message in the form of the multimedia message based on the operations of step 105.

step 108: when the special flag is not included or when the receiving party does not choose to download the template, the message is displayed in the form of the common short message.

Figure 2:
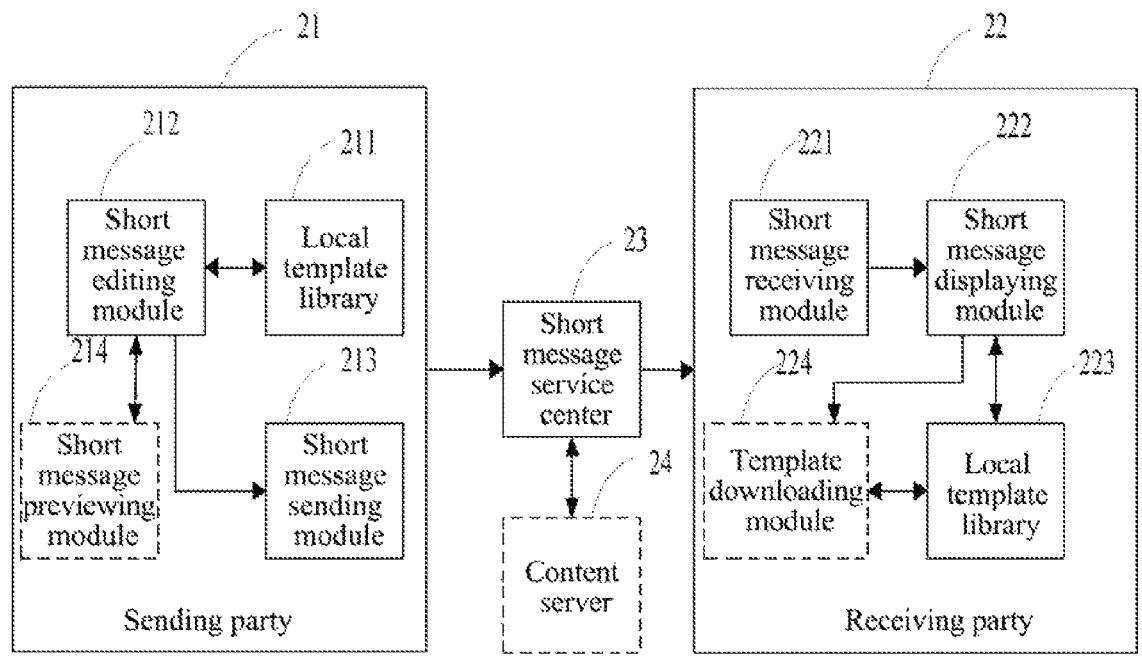
FIG. 2 is the structural schematic diagram of a system for processing a short message implemented according to the present invention.

With the aforementioned method, the present invention implements a system for processing a short message, and as shown in FIG. 2, the system comprises: a sending party 21, a receiving party 22, and a short message service center 23; wherein, the sending party 21 is configured to: edit short message text and send a short message including the short message text, a template ID and a special flag for indicating that the template ID is included to the short message service center 23;

the receiving party 22 is configured to: analyze the short message body and judge whether the template ID is included in the short message body or not by searching the special flag, and if the template ID is included, find a template with the same template ID, and combine the short message text and the template to display the short message in the form of the multimedia message; if the template ID is not included, display the short message in the form of the common short message;

the short message service center 22 is configured to: receive short messages from the sending party 21 and send the short messages to the receiving party 22.

The sending party 21 comprises: a local template library 211, a short message editing module 212, and a short message sending module 213; wherein, the local template library 211 is configured to store the local templates of the sending party;

the short message editing module 212 is configured to: edit the short message text, and select a template from the local template library 211, extract the template ID, and add a special flag which is used for indicating that the template ID is included and separates the template ID from the short message text, and take the template ID, the special flag and the short message text to be sent as the short message body to send to the short message sending module 213 all together;

the short message sending module 213 is configured to send the short messages to the short message service center 23;

furthermore, the sending party 21 also comprises:

a short message previewing module 214, which is configured to: combine the template and the short message text to be previewed when the short message editing module 212 selects a template from the local template library 211, and prompt confirmation, exit the preview after the confirmation, and send a confirmation message to the short message editing module 212; and then the short message editing module 212 will continue to extract the template ID, to add the special flag, and to take the template ID, the special flag and the short message text to be sent as the short message body to send to the short message sending module 213 all together.

The receiving party 22 comprises: a short message receiving module 221, a short message displaying module 222, and a local template library 223; wherein, the local template library 223 is configured to store the local templates of the receiving party;

the short message receiving module 221 is configured to: receive the short messages sent from the short message service center 23 and send the short messages to the short message displaying module 222;

the short message displaying module 222 is configured to: analyze the short message body and judge whether the template ID is included in the short message body or not by searching the special flag, and if the template ID is included, analyze and obtain the template ID according to the special flag, find a template with the same template ID from the local template library 223, and combine the short message text and the template to display the short message in the form of the multimedia message; if the template ID is not included, display the short message in the form of the common short message.

Furthermore, when the short message displaying module 222 does not find a template with the same template ID from the local template library 223, the message displaying module 222 prompts whether to download the template or not, and starts the template downloading module 224 when choosing to download the template.

Furthermore, the receiving party 22 also comprises:

a template downloading module 224, which is configured to: send a special short message including the template ID of the template to be downloaded to the short message service center 23, and download the template and save the template to the local template library 223 according to a notification message with the download address sent from the short message service center 23.

Furthermore, the short message service center 23 is also configured to receive the special short message including the template ID of the template to be downloaded sent from the receiving party 22, and find the download address of the template in the content server in the network according to the template ID in the special message, and send this download address to the receiving party 22.

Furthermore, the system also comprises:

a content server 24, which is configured to: store the templates uploaded by the content provider or the users and provide the download addresses of the templates for the short message service center 23.

Figure 3:
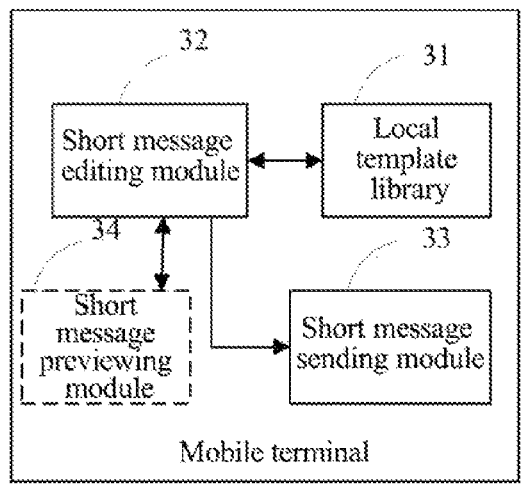
FIG. 3 is the structural schematic diagram of a mobile terminal implemented according to the present invention.

Based on the aforementioned system, the present invention also provides a mobile terminal, and as shown in FIG. 3, the mobile terminal comprises: the local template library 31, the short message editing module 32, and the short message sending module 33; wherein, the local template library 31 is configured to store the local templates of the sending party;

the short message editing module 32 is configured to: edit the short message text, and select a template from the local template library 31, extract the template ID, and add a special flag for indicating that the template ID is included, and take the template ID, the special flag and the short message text to be sent as the short message body to send to the short message sending module 33 all together;

the short message sending module 33 is configured to send short messages to the short message service center.

The mobile terminal further comprises:

a short message previewing module 34, which is configured to combine the selected template and the short message text to be previewed when the short message editing module 32 selects a template from the local template library 31.

Figure 4:
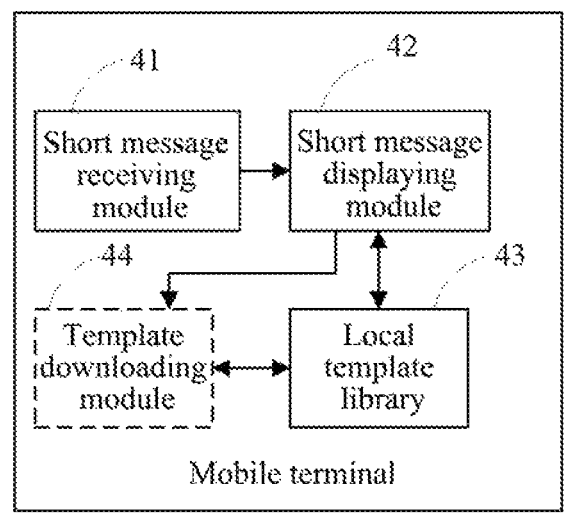
FIG. 4 is the structural schematic diagram of another mobile terminal implemented according to the present invention.

Based on the aforementioned system, the present invention also provides a mobile terminal, and as shown in FIG. 4, the mobile terminal comprises: the short message receiving module 41, the short message displaying module 42, and the local template library 43; wherein, the short message receiving module 41 is configured to: receive short messages sent from the short message service center and forward the short messages to the short message displaying module 42;

the short message displaying module 42 is configured to: analyze the short message body and judge whether the template ID is included in the short message body or not by searching the special flag, analyze and obtain the template ID, find a template with the same template ID from the local template library 43, and combine the short message text and the found template to display the short message in the form of the multimedia message;

the local template library 43 is configured to store the local templates of the receiving party.

The mobile terminal further comprises:

a template downloading module 44, which is configured to: send a short message including the template ID of the template to be downloaded to the short message service center 23, and download the template and save the template to the local template library 43 according to a notification message with the download address sent from the short message service center 23.

The above description is the preferred embodiments of the present invention rather than the restriction of the protection scope of the present invention. All of modifications or variations made within the spirit and essence of the present invention should fall into the protection scope of the present invention.

What is claimed is:

1. A method for processing a short message, comprising:

a sending party editing short message text and sending a short message including the short message text and a template identifier (ID) to a short message service center; and a receiving party receiving the short message sent from the short message service center, analyzing to obtain the template ID included in the short message, then finding a template with a same template ID, and combining the template that is found with the short message text to be displayed;

wherein the method further comprises:

when the template with the same template ID is not found in the receiving party, the receiving party prompting whether to download a corresponding template; and when it is chosen to download the template, the receiving party downloading the template from a content server in a network and using the downloaded template to display the short message.

2. The method of claim 1, wherein the sending party editing the short message text and sending the short message including the short message text and the template ID to the short message service center comprises: the sending party editing the short message text, selecting a template from a local template library, extracting the template ID of the template that is selected, and adding a special flag for indicating that the template ID is included, and the sending party taking the short message text, the template ID and the special flag as a short message body to send to the short message service center.

3. The method of claim 2, wherein said analyzing to obtain the template ID included in the short message comprises: the receiving party analyzing the short message body after receiving the short message, determining whether the template ID is included in the short message by searching the special flag, and obtaining the template ID when the template ID is included in the short message.

4. The method of claim 2, after selecting the template from the local template library, the method further comprising: previewing the template that is selected;
previewing the template that is selected comprises: choosing to preview the template, and the template automatically filling the short message text into a corresponding field in a template packet to be previewed.

5. The method of claim 1, wherein finding the template with the same template ID comprises: finding the template with the same template ID from a local template library; and
prompting whether to download a corresponding template comprises: when the template with the same template ID is not found in the local template library, prompting whether to download a corresponding template.

6. A system for processing a short message, comprising:
a sending party comprising a processor and a memory, the processor being configured to: edit short message text, and send a short message including the short message text and a template ID to a short message service center;
the short message service center, which is configured to: receive the short message from the sending party, and send the short message to a receiving party; and
the receiving party comprising a processor and a memory, the processor being configured to: analyze a short message body and obtain the template ID included in the short message, find a template with a same template ID, and combine the short message text with the template that is found to be displayed;
wherein the processor of the receiving party is further configured to prompt whether to download a corresponding template when the template with the same template ID is not found, and when it is chosen to download the template, to download the template from a content server in a network and use the downloaded template to display the short message.

7. The system of claim 6, wherein the processor of the sending party comprises a short message editing module and a short message sending module, and the memory of the sending party comprises a local template library; wherein,
the local template library is configured to: store local templates of the sending party;
the short message editing module is configured to: edit the short message text, and select a template from the local template library, extract the template ID, and add a special flag for indicating that the template ID is included, take the template ID, the special flag and the short message text to be sent as the short message body to send to the short message sending module all together;
the short message sending module is configured to: send the short message to the short message service center.

8. The system of claim 7, wherein the processor of the receiving party comprises a short message receiving module and a short message displaying module, and the memory of the receiving party comprises a local template library; wherein,
the short message receiving module is configured to: receive the short message sent from the short message service center and forward the short message to the short message displaying module;
the short message displaying module is configured to: analyze the short message body, determine whether the template ID is included in the short message body by searching the special flag, obtain the template ID when the template ID is included in the short message body, find the template with the same template ID in the local template library, and combine the short message text with the template that is found to be displayed in a form of a multimedia message;
the local template library is configured to: store local templates of the receiving party.

9. The system of claim 7, wherein the sending party is a mobile terminal.

10. The system of claim 6, wherein the processor of the sending party further comprises:
a short message previewing module, which is configured to combine the template that is selected with the short message text to be previewed when the short message editing module selects the template from the local template library.

11. The system of claim 10, wherein the sending party is a mobile terminal.

12. The system of claim 6, wherein the processor of the receiving party further comprises: a template downloading module, which is configured to: send a short message with the template ID of a template to be downloaded to the short message service center and download the template and save the template into the local template library based on a notification message including a download address sent from the short message service center;
the short message service center is also configured to: receive the short message including the template ID of the template to be downloaded sent by the receiving party, and find the download address of the template in the content server in the network according to the template ID in the short message, and send the download address to the receiving party;
the content server is configured to: store templates uploaded by content providers or users and provide download addresses of templates for the short message service center.

13. A mobile terminal, comprising a processor and a memory, the processor comprising a short message receiving module and a short message displaying module, and the memory comprising a local template library; wherein,
the short message receiving module is configured to: receive a short message sent from a short message service center and forward the short message to the short message displaying module;
the short message displaying module is configured to: analyze a short message body, determine whether a template ID is included in the short message body by searching a special flag, obtain the template ID when the template ID is included in the short message body, find a template with a same template ID in the local template library, and combine short message text with the template that is found to be displayed in a form of a multimedia message;

the local template library is configured to: store local templates of a receiving party;

wherein the short message displaying module is further configured to prompt whether to download a corresponding template when the template with the same template ID is not found in the local template library, and when it is chosen to download the template, to start a template downloading module in the processor of the mobile terminal to download the template from a content server in a network, and then to use the downloaded template to display the short message.

14. The mobile terminal of claim 13, wherein:

the template downloading module is configured to: send a short message with the template ID of a template to be downloaded to the short message service center and download the template and save the template into the local template library based on a notification message including a download address in the content server in the network sent from the short message service center.

\* \* \* \* \*